United States Patent [19]
Sayyadi

[11] Patent Number: 5,275,674
[45] Date of Patent: Jan. 4, 1994

[54] METHOD AND APPARATUS FOR FORMING A WELDED IDENTIFICATION SLEEVE

[75] Inventor: Babak Sayyadi, Seattle, Wash.

[73] Assignee: The Boeing Company, Seattle, Wash.

[21] Appl. No.: 723,246

[22] Filed: Jun. 28, 1991

[51] Int. Cl.⁵ .................... B65B 11/00; B65C 7/00
[52] U.S. Cl. .................... 156/73.1; 156/468; 156/492; 156/522; 53/582
[58] Field of Search ............... 156/392, 468, 510, 522, 156/580, 583.1, 475, 492, 73.1; 53/399, 582, 588, 589, 592

[56] References Cited

U.S. PATENT DOCUMENTS

| | | | |
|---|---|---|---|
| 2,006,116 | 6/1935 | Schmiedel | 156/475 X |
| 2,543,323 | 2/1951 | Marsh | 216/30 |
| 2,941,570 | 6/1960 | Plym | 156/475 X |
| 3,093,943 | 6/1963 | Kazimir | 53/592 |
| 3,466,847 | 9/1969 | Farkas | 53/198 |
| 3,864,191 | 2/1975 | Tovarys | 156/468 |
| 4,265,687 | 5/1981 | Mercer et al. | 156/73.1 |
| 4,316,760 | 2/1982 | Satomi | 156/468 |
| 4,570,422 | 2/1986 | Watanabe et al. | 53/557 |
| 4,576,675 | 3/1986 | Brux | 156/468 |
| 4,665,679 | 5/1987 | Watanabe | 53/131 |
| 4,770,729 | 9/1988 | Spencer et al. | 156/73.1 |
| 4,832,767 | 5/1989 | Eller | 156/53 |

FOREIGN PATENT DOCUMENTS

WO88/01247  2/1988  PCT Int'l Appl. ............ B65C 3/02

Primary Examiner—David A. Simmons
Assistant Examiner—James J. Engel, Jr.
Attorney, Agent, or Firm—Christensen, O'Connor, Johnson & Kindness

[57] ABSTRACT

A welded sleeve applicator (10) and method for forming an identification sleeve (34) around an elongate object (16) is disclosed. A leading end portion (22) of a continuous strip (24) of identification indicia-bearing, ultrasonically weldable material is fed by a printer (18) onto a base (12), passing under an elongate object that is received on the base. The leading end portion of the material strip overlies a flexible wrapping strap (26). A pivot arm (28) wraps the strap and the leading end portion of the material strip around the elongate object. The wrapped leading end portion of the material strip is retained in place over an adjacent second portion (100) of the material strip by a vacuum drawn through a guide (30). The pivot arm and wrapping strap are removed, and an ultrasonic welding horn (32) is lowered to weld the leading end portion and the second portion of the material strip together, forming an indicia-bearing, tubular sleeve.

7 Claims, 5 Drawing Sheets

METHOD AND APPARATUS FOR FORMING A WELDED IDENTIFICATION SLEEVE

TECHNICAL FIELD OF THE INVENTION

The present invention is directed to methods and apparatus for identifying objects and, more particularly, to methods and apparatus for applying identification sleeves to elongate objects.

BACKGROUND OF THE INVENTION

Many manufacturing processes require placement of identification tags on thin, elongate objects, such as wires, hoses and pipes. In complex communication and electric power distribution systems, individual wires within wiring harnesses must be correctly identified for proper connection of subsystems. Similarly, in hydraulic and pneumatic systems, hydraulic and pneumatic hoses and tubes also must be identified for correct coupling. Tags must be applied in a manner to identify individual objects with certainty, while not harming the object nor interfering with interconnection or function of the objects.

Conventional techniques for identifying individual conductors within wiring harnesses, such as those used in aircraft electrical systems, involve the placement of heat shrinkable, tubular identification sleeves over individual conductors, conductor-bundles, or cables. The tubular sleeving, commonly referred to as heat shrink tubing, is made of polymeric material that has been previously expanded and that, when heated, shrinks down to its original dimensions to form a tight fit around the object over which it has been placed. A length of conventional heat-shrink tubing is first marked by embossing or printing with identification indicia, such as numerals or letters. The marked tubing is then cut into individual pieces of a desired length, which are then individually threaded onto the object to be identified. Individual handling, marking and application of cut tubing is cumbersome and time-consuming.

An alternative type of conventional sleeve has been developed that is somewhat easier to mark with identification indicia. Two flat sheets of heat shrinkable material are periodically welded together along transverse lines to form a welded sheet of flat sleeves. The welded sheet can then be printed upon to place indicia on each sleeve. Individual sleeves are cut from the sheet prior to placement on wires or other objects to be identified.

Both heat-shrink tubing and flat welded sheets have the disadvantage of needing to be preprinted in advance with the identification indicia expected to be required for a particular manufacturing process. The individual operator then must select the correct preprinted sleeve corresponding to a particular wire to be identified. The requirement of preprinting and preparing individual sleeves is costly and time-consuming, and does not allow production flexibility with regard to changing identification requirements during a manufacturing run. Existing methods also do not enable printing on both sides of a piece of sleeving, as is sometimes desired, without turning over the sleeving.

An improved method for identifying objects is disclosed by U.S. Pat. No. 4,770,729, entitled "Method of Making a Welded Sleeve Identification" and assigned to the assignee of the current application. The method involves the printing of indicia on the leading end of a continuous strip of heat-shrinkable material, cutting indicia bearing pieces from the strip, and wrapping the pieces around an object to be identified. Each cut piece is gripped by a multiple joint arm and then moved to a position over top of the object to be identified, whereupon it is wrapped around the wire in a generally U-shaped configuration. The outwardly extending ends of the U-shaped pieces are then ultrasonically welded together adjacent the object to form a welded sleeve that can later be heat-shrunk into place. While this method represents a significant improvement over other prior art methods, the method has a disadvantage associated with handling the individual cut pieces of material and potential problems associated with mispositioning cut pieces when they are wrapped around the object to be identified.

SUMMARY OF THE PRESENT INVENTION

The present invention provides a method and apparatus for forming an identification sleeve around an elongate object. An end portion of a continuous strip of identification indicia-bearing, ultrasonically weldable material is fed past an elongate object to be identified. The end portion of the material strip is then wrapped around the elongate object to overlap an adjacent second portion of the material strip. The end portion of the material strip is ultrasonically welded to the overlapped second portion of the material strip to form an indicia-bearing, tubular sleeve, which is then severed from the material strip.

In a further aspect of the present invention, the end portion of a material strip lays against a flexible strap after the end portion of the material strip is fed past an elongate object to be marked. The end portion of the material strip is wrapped around the elongate object by wrapping the flexible strap partially around the elongate object. The end portion of the material strip is thus disposed between the flexible strap and the elongate object. The wrapped end portion of the material strip is then secured in place, the flexible strap is unwrapped, and the strip is ultrasonically welded to form a tubular sleeve. The tubular sleeve is then severed from the material strip.

In a still further aspect of the present invention, identification indicia corresponding to an elongate object to be identified are printed onto the material strip prior to feeding the strip past the elongate object, followed by wrapping the elongate strip around the object and ultrasonic welding to form a tubular sleeve.

The method and apparatus of the present invention enables formation of tubular sleeves for a variety of diameters of elongate objects, with the apparatus self-adjusting to the diameter of the object to form a sleeve of the correct diameter. Each sleeve is individually marked as it is produced with indicia corresponding to the particular object to be identified. Thus, the present invention enhances manufacturing flexibility as both the indicia to be marked on a sleeve and the size of the sleeve can be altered on an as-needed basis depending on the object to be identified. Further, as with U.S. Pat. No. 4,770,729, the expense of preprinting batches of sleeves of particular sizes is thus avoided, as is the waste associated with surplus preprinted sleeves. Also, application of the welded sleeve is fast and requires less labor than threading on conventional tubular sleeves. However, in contrast to U.S. Pat. No. 4,770,729, the tubular sleeve produced by the process and apparatus of the present invention is not severed from the continuous material strip until it is welded, thus avoiding any placement problems that may be associated with the utilization of pre-cut pieces of strip to form welded sleeves.

BRIEF DESCRIPTION OF THE DRAWINGS

The foregoing and other advantages and features of the invention will be better understood from the following detailed description, taken in conjunction with the accompanying drawings, wherein.

DETAILED DESCRIPTION OF THE PREFERRED EMBODIMENT

Figure 1:
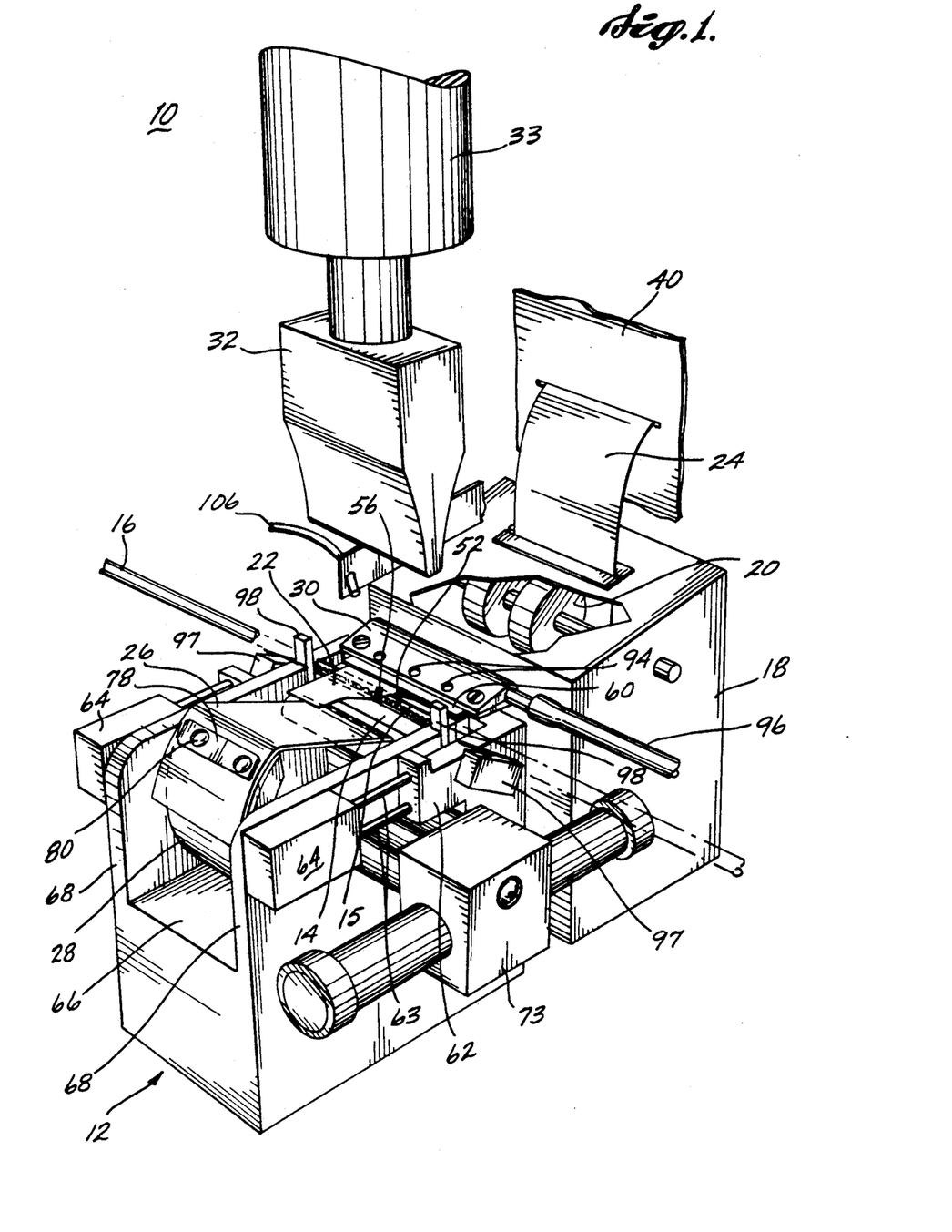
FIG. 1 is a pictorial view of a preferred embodiment of a welded identification sleeve applicator constructed in accordance with the present invention.

A welded identification sleeve applicator 10 constructed in accordance with the present invention is shown in FIG. 1. The applicator 10 includes a base 12 having a receiving region 14 for receiving an elongate object, such as the bundled electrical conductor 16 shown in FIG. 1. The base also has a weld region 15, adjacent the receiving region 14, for welding an identification sleeve around the received elongate object. The applicator 10 further includes a printer 18 having friction rollers 20 for selectively feeding a leading end portion 22 of a continuous strip 24 of ultrasonically weldable material. Identification indicia, such as numerals, letters, geometric symbols or colors, are printed or embossed onto the material strip 24 by the printer 18. The friction rollers 20 advance the leading end portion 22 of the material strip 24 over the weld region 15, and then over the receiving region 14 of the base 12, under the conductor 16.

Figures 2, 3:
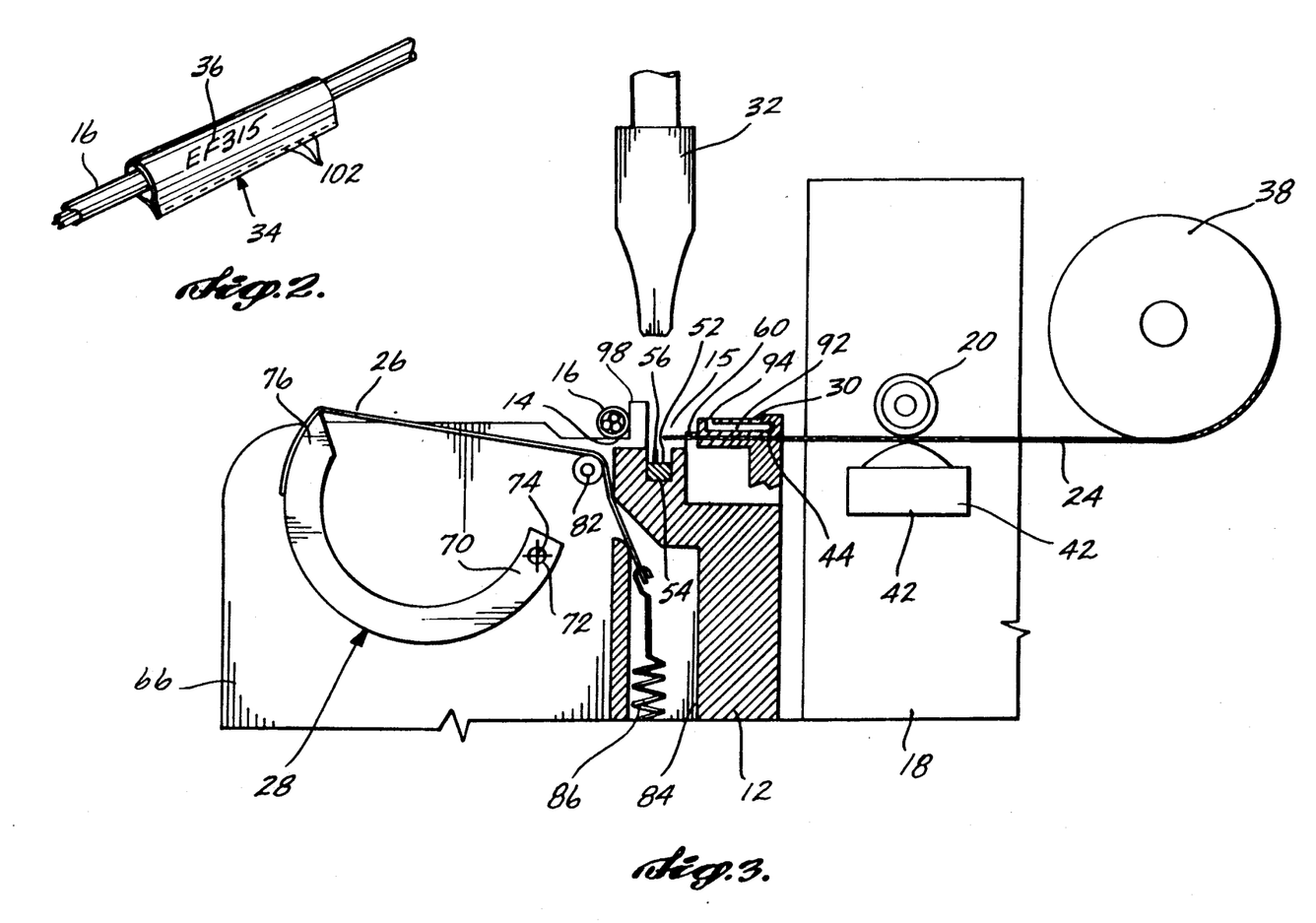
FIG. 2 is a pictorial view of a welded identification sleeve formed to encircle a conductor bundle in accordance with the present invention.
FIG. 3 is a side elevation, partial cross-sectional, schematic diagram of the welded sleeve applicator shown in FIG. 1, with the reciprocating guide shown in the retracted position prior to feeding the material strip.

The applicator 10 further includes a mechanism for wrapping the leading end portion 22 of the material strip 24 about the conductor 16. The mechanism includes a flexible wrapping strap 26 and a pivot arm 28, both secured to the base 12 as shown in FIGS. 1 and 3. When the leading end portion 22 of the material strip 24 has been fed under the conductor 16 and over the receiving region 14 of the base, it is received on top of and overlies the flexible wrapping strap 26, as shown in FIG. 1. The material strip 24 is thus positioned to be wrapped about the conductor 16 and welding in place to form a tubular sleeve around the conductor.

As described more fully below, the pivot arm 28 is selectively pivotable to manipulate the strap 26 to wrap the leading end portion 22 of the material strip 24 about the conductor 16. The leading end portion 22 is retained in this wrapped position by a vacuum drawn through a reciprocating guide assembly 30. The pivot arm 28 and wrapping strap 26 are then withdrawn. An ultrasonic welding horn 32 of an ultrasonic welder 33 is lowered to weld the material strip 24 to itself, forming a tubular welded sleeve 34 bearing identification indicia 36, as shown in FIG. 2. In the preferred embodiment of an applicator 10 described herein, the sleeve 34 is simultaneously severed from the material strip 24 as it is welded around the conductor 16.

Referring now to FIGS. 1 and 3 to more fully describe the construction of the applicator 10, the material strip 24 is supplied from a continuous roll 38 (FIG. 3) or other source of material strip housed within a supply housing 40 (FIG. 1). The material strip 24 is formed from any ultrasonically weldable material capable of being printed, embossed, heat-stamped or otherwise marked. Most preferably, the material strip 24 comprises a strip of a heat-shrinkable thermoplastic material, such as heat-shrinkable polyolefin plastic. Various other materials would be suitable, such as polyvinylchloride. The ultrasonically weldable material need not be heat shrinkable if it is not necessary for a particular application to tightly fit the identification sleeve on the object to be identified.

The material strip 24 is fed into a conventional printer 18 included rearwardly of base 12. As viewed in FIG. 1 and used herein throughout, rearward refers to the end of the base 12 closest in proximity the printer 18, while forward refers to the end of the base 12 furthest from the printer 18. The printer 18 includes a mechanism for feeding the material strip 24 through the printer and remainder of the applicator 10, such as rubber-coated friction rollers 20. Various other feed mechanisms mounted elsewhere on the applicator could be used in conjunction with or in lieu of the rollers 20, such as a frictional reciprocating foot or a vacuum gripping device. The printer 18 further includes a print head 42, such as a dot matrix impact print head shown schematically in FIG. 3, to mark indicia on the strip 24. It should be readily apparent that a printer utilizing another conventional type of printing technology could be utilized, such as an ink jet printer or thermal printer, if compatible with the particular weldable sleeve material.

The material strip 24 is selectively fed from the printer 18 to the base 12, where it is received within a slot 44 formed longitudinally through the reciprocating guide 30, as shown in FIG. 3. The guide 30 serves to guide the first end 22 of the material strip 24 over the weld region 15 of the base and under the conductor 16 when the strip is fed by the rollers 20 of the printer 18.

A transversely disposed cutting blade 52 projects upwardly from a transverse recess 54 formed in the upper surface of the weld portion of the base 12, between the receiving region 14 of the base and the rearward end of the base 12. An ultrasonic welding pattern 56 is also mounted within the transverse recess 54, between the cutting blade 52 and the receiving region 14 of the base, parallel to the cutting blade 52. As shown in FIG. 1, the welding pattern 56 comprises a vertical metal plate having an upper edge that is contoured in a sawtoothed fashion, forming alternating high and low flat spots. The welding pattern 56 and cutting blade 52 project upwardly and are aligned below the ultrasonic welding horn 32 suspended above the base 12. The cutting blade 52 preferably projects upwardly slightly more than the welding pattern 56, by a distance approximately equal to twice the thickness of the material strip 24. The welding pattern 56 and cutting blade 52 are horizontally spaced slightly apart from each other. The amount of spacing should be as small a distance as possible, such as less than approximately 1 mm apart to avoid the formation of a large ridge next to the weld line formed on the sleeve.

Figure 4:
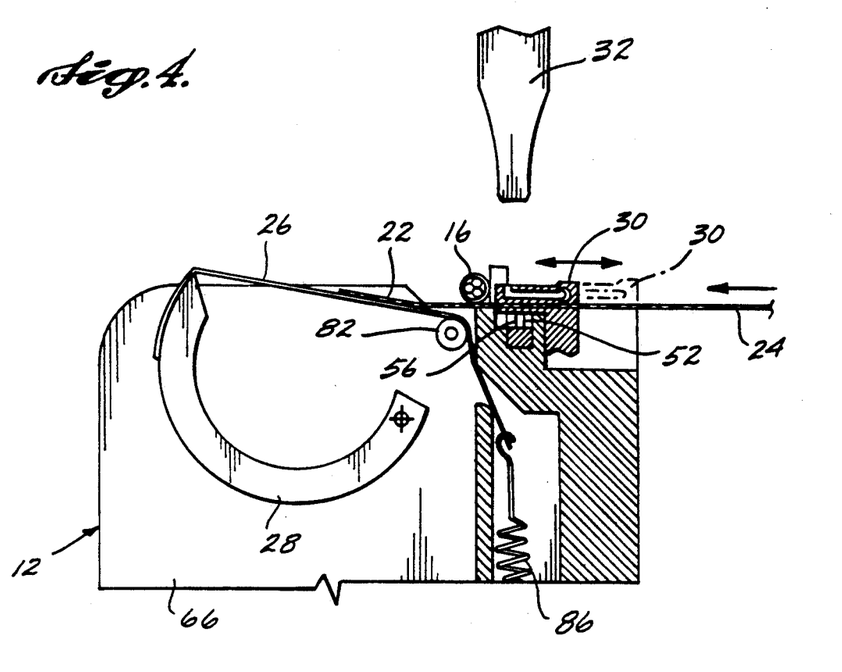
FIGS. 4 through 7 are a sequence of views corresponding to FIG. 3 and depicting the operation of the welded identification sleeve applicator during the steps of feeding, wrapping, welding, and severing the identification sleeve.

Referring still to FIG. 3, the leading end portion 22 of the material strip 24 projects outwardly through two spaced-apart horizontal flanges 60 formed on the guide 30 on either side of the forward edge of the slot 44. The guide 30 reciprocates between a rearward, retracted position adjacent the printer 18, as shown in FIG. 3, and a forward, advanced position adjacent the receiving region 14 of the base 12, as shown in FIG. 4. The guide 30 moves to the advanced position to cover the cutting blade 52 and welding pattern 56 during feeding of the material strip 24, preventing the leading end portion 22 of the material strip from catching on the upwardly projecting blade 52 and welding pattern 56. After the leading end portion 22 of the material strip 24 has been fed onto the receiving region 14 of the base, the guide 30 is withdrawn to the retracted position so as to not interfere with the welding and severing of the strip 24.

This reciprocating motion of the guide 30 is enabled by mounting the guide 30 atop two slidable carriage plates 62 mounted on either side of the base 12, as shown in FIG. 1. Each carriage plate 62 is connected to the shafts 63 of a pneumatic actuator 64 secured to either side of the forward end of the base 12. When the shafts 63 are retracted and extended, the carriage plates 62 and the guide 30 slide forwardly and rearwardly relative to the base 12.

A large recess 66 is formed centrally in the base 12 forwardly of and adjacent to the receiving region 14. The base 12 defines first and second vertical end walls 68 on either side of the recess 66. A first end 70 of the pivot arm 28 is non-rotatably mounted on a pivotal shaft 72 located within the recess 66. The shaft 72 extends from a rotary actuator 73 mounted externally on one end wall 68 of the base 12, through aligned openings formed in both end walls 68. The rotary actuator 73 is used to rotate the rod 72 and the pivot arm 28. One suitable rotary actuator is a rotary air cylinder available from Bimba Manufacturing Company, Monee, Ill., under the name "Pneu Turn." The rotary actuator converts pneumatic pressure to rotary motion to selectively rotate the pivot arm 28 about a central pivot axis 74 of the shaft 72. However, it should be apparent that other rotating means such as a reversible motor could be utilized to rotate the shaft and pivot arm.

Referring to FIG. 3, the pivot arm 28 has a generally semi-cylindrical configuration, curving from the first end 70 to a second end 76. The flexible wrapping strap 26 has a first end that is secured to the second end 76 of the pivot arm 28 by a plate 78 and conventional fasteners 80. The flexible strap 26 passes over the upper side of a transverse rod 82 that is mounted between the end walls 68 within the recess 66, adjacent the receiving region 14 of the base 12. The second end of the flexible wrapping strap 26 then passes into a cavity 84 formed internally within the base 12 below the receiving region 14. The second end of the flexible wrapping strap 26 is secured within the cavity 84 to one end of a coil spring 86, with the other end (not shown) of the coil spring 86 extending downwardly into the cavity 84, where it is secured to the base 12. The coil spring 86 places tension on the flexible wrapping strap 26 to keep the strap taut regardless of the position of the pivot arm 28.

Figure 5:
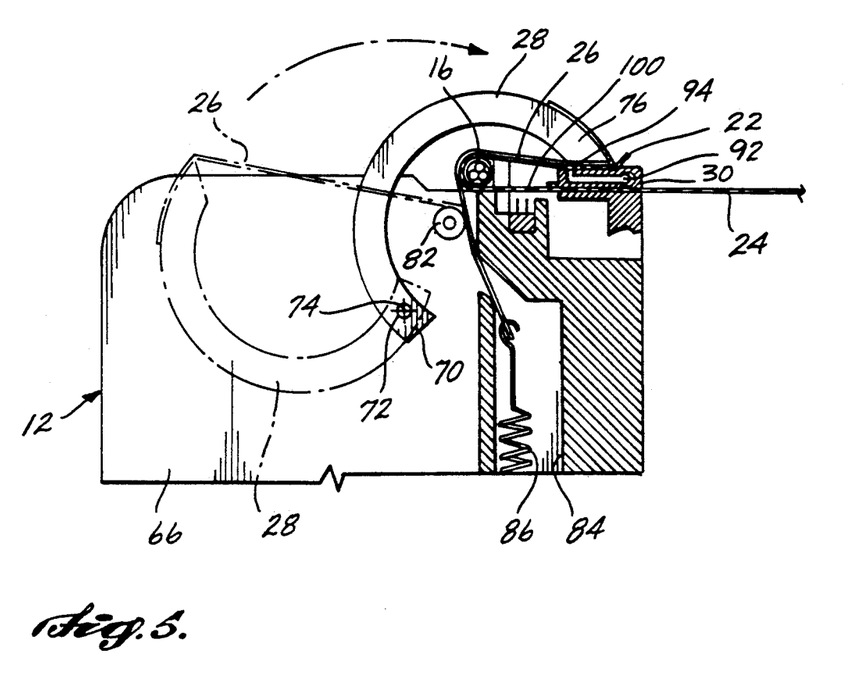

Referring to FIG. 5, when the pivot arm is pivoted upwardly about the pivot axis 74, the strap 26 and overlying portion of the material strip 24 are partially wrapped around the received conductor 16. Because of the curvature of the pivot arm 28, the flexibility of the wrapping strap 26, and the strap biasing spring 86, the wrapping strap 26 is able to accommodate a range of diameters of elongate objects, e.g., conductors, tubes, hoses, and the like, to be identified. The spring 86 lengthens and retracts as necessary to keep the strap 26 taut regardless of whether the strap is wrapped around small or large diameter objects. The spring 86 also allows adjustment of the tension on the strap 26.

The wrapping strap 26 is formed from a flexible material that conforms to the outer perimeter of the conductor 16 or other object to be identified. Preferably, the strap is composed of an elastomeric material, such as silicone rubber. The strap is thus able to stretch to the extent necessary to conform to the peripheral configuration of the object to be identified. It should be apparent that rather than using a spring 86, an elastomeric wrapping strap capable of undergoing a large degree of elongation could be used by itself, with the second end of the strap being secured directly to the base. The elongation of the strap must be sufficient to accommodate different sizes of objects to be identified. However, when a deformable biasing member such as spring 86 is used, the flexible strap need not stretch and can be reinforced with a fiber if desired. Reinforcement of the strap 26 has not been found necessary in one actual embodiment of this invention.

When the strap 26 has been wrapped around the conductor 16 as shown in FIG. 5, the leading end portion 22 of the material strip 24 contacts the upper surface of the reciprocating guide 30. The guide 30 includes a plurality of vacuum passages 92 that terminate in vacuum orifices 94 defined in the upper surface of the guide 30. The vacuum passages 92 are in fluid communication with a vacuum line 96 (FIG. 1) attached between the guide 30 and a vacuum source 95. After the strap 26 wraps the material strip 24 about the conductor 16, a vacuum is drawn through the guide 30, resulting in the leading end portion 22 of the strip 24 being drawn onto the upper surface of the guide 30. The pivot arm 28 can then be returned to its lowered position, unwrapping the strap 26 from the wrapped material strip 24 to enable welding and severing of an identification sleeve, as shall be described subsequently.

Operation of the welded sleeve applicator 10 is controlled by a controller 88, such as a programmable computer. The welded sleeve applicator 10 is operated cyclically to individually wrap conductors 16 or other objects. Referring to FIG. 1, a sleeve wrap and weld cycle is initiated by closure of two switches 97, mounted on the carriages 62 on either side of the base 12.

Referring to FIGS. 1 and 3, the receiving region 14 of the base 12 includes two stops 98 projecting upwardly from either side of the base 12, forwardly of the transverse recess 54. The conductor 16 or other elongated object to be identified is received in the corners formed by the top of the base 12 and the stops 98. The switches 97 are closed by pressure of the conductor 16 when an operator places the conductor 16 onto the top of the base 12 against the stops 98.

Figure 8:
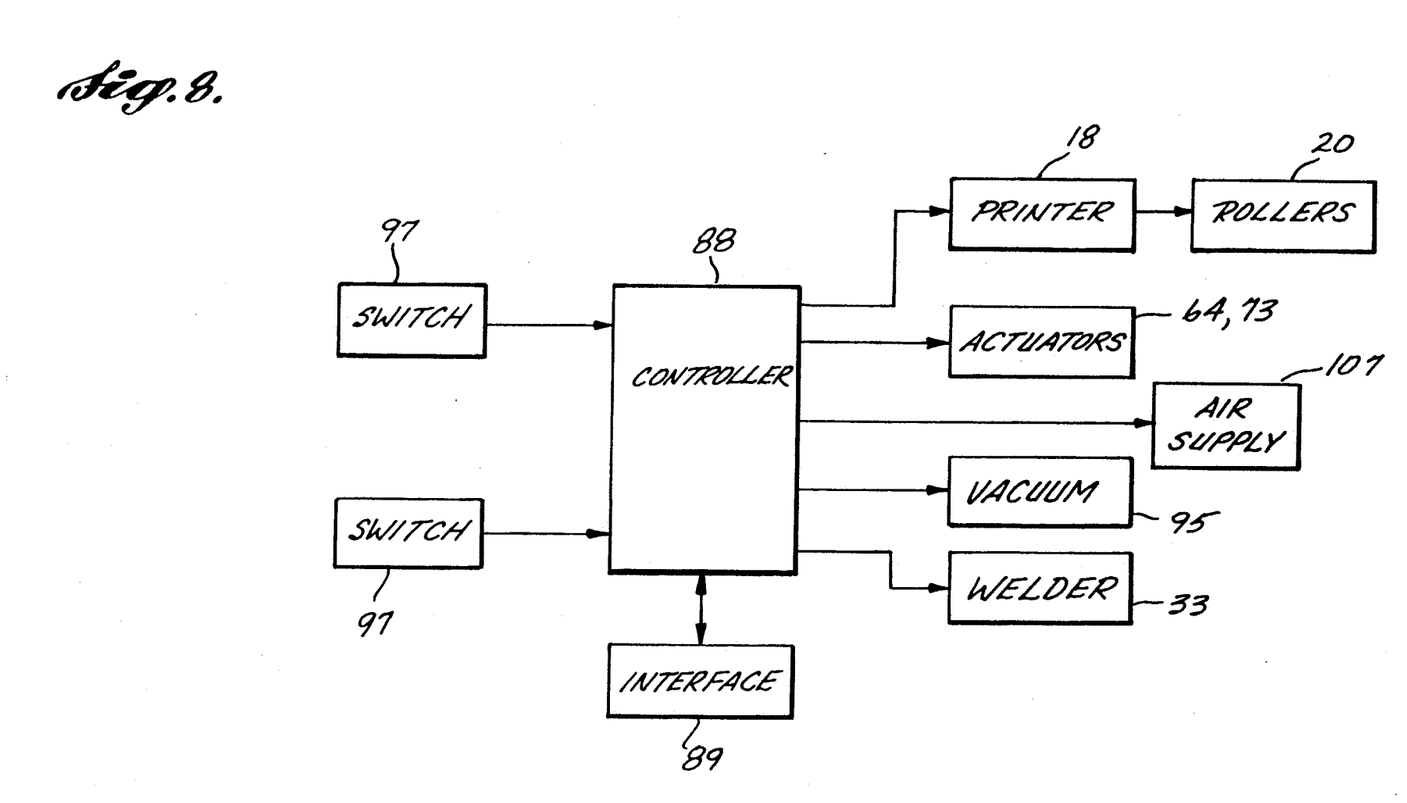
FIG. 8 is a schematic block diagram of the controller and controlled elements of the welded identification sleeve applicator of FIG. 1.

Referring to the block diagram of FIG. 8, closure of the switches 97 signals the controller 88 to start a cycle. The controller 88 then communicates with the printer 18 to initiate printing of indicia on the material strip 24. The indicia that are marked are determined by instructions previously entered by an operator through an interface 89, such as keypad. After printing, the controller 88 communicates with the printer 18 to activate the rollers 20 to feed the material strip 24.

The controller 88 also instructs the pneumatic actuators 64 to advance, and then retract, the guide 30 during feeding of the material strip 24. After feeding is completed, the controller 88 instructs the rotary actuator 73 to pivot the pivot arm 28, wrapping the strap 26 around the conductor 16 and biasing the conductor 16 against the stops 98. The controller 88 then instructs the vacuum source 95 to draw a vacuum through the guide 30, and instructs the rotary actuator 73 to pivot the pivot arm 28 back to its initial position. The controller 88 then instructs the welder 33 to lower the welding horn 32 and weld and cut the material strip 24.

OPERATION

The operation of the welded sleeve applicator 10 will now be described with reference to FIGS. 3-7. Referring first to FIG. 3, after completion of a previous wrap and weld cycle, the guide 30 is in the retracted position. Prior to a new wrap and weld cycle, the leading end portion 22 of the material strip 24 remains threaded through the slot 44 in the guide 30. A new wrap and weld cycle is initiated by placing the conductor 16 on the receiving region 14 of the base 12, and depressing the switches 97 as previously described. The controller 88 has been preprogrammed with the indicia desired to be marked on the sleeve corresponding to the conductor 16. Upon initiation of the cycle, the printer 42 prints the desired indicia on the underside of the material strip 24, which is then advanced by rotation of the friction rollers 20.

Referring next to FIG. 4, as the material strip 24 is advanced through the applicator 10, the reciprocating guide 30 moves to the advanced position to prevent the forward edge of the leading end portion 22 of the material strip 24 from catching on the cutting blade 52 and the welding pattern 56. The material strip 24 is advanced until the leading end portion 22 has been fed over the weld region 15 and receiving region 14, and passed under the conductor 16 to overlie the wrapping strap 26. At this point, the portion of the material strip 24 marked with the indicia is located starting directly below or just forwardly of the conductor 16. The reciprocating guide 30 then moves back to the retracted position, as shown in phantom in FIG. 4.

Referring next to FIG. 5, the pivot arm 28 then pivots on rod 72 about the pivot axis 74, upwardly from the position shown in phantom in FIG. 5, to a position wherein the second end 76 of the pivot arm 28 arcs over the conductor 16. In this position, the wrapping strap 26 and leading end portion 22 of the material strip 24 are wrapped partially about the conductor 16. The flexible wrapping strap 26 is maintained taut by the spring 86, and adjusts corresponding to the diameter of the conductor 16.

In this wrapped configuration, the leading end portion 22 of the material strip 24 overlies an adjacent second portion 100 of the material strip 24, directly over the weld region 15 of the base 12. Rearwardly of the weld region 15, the leading end portion 22 of the material strip 24 contacts the upper surface of the guide 30, and is retained by a vacuum drawn through the vacuum passages 92.

Figure 6:
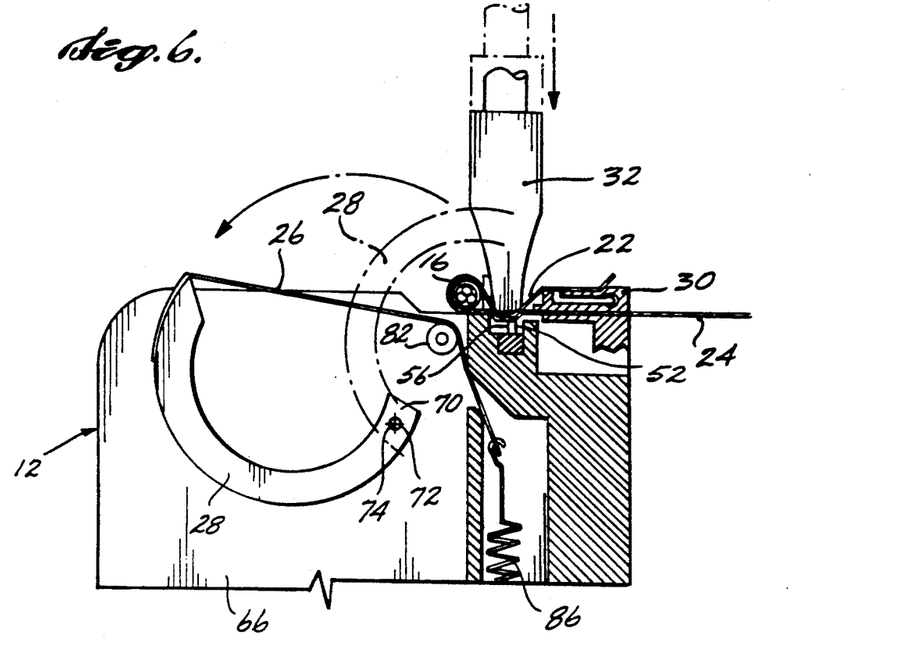

Referring next to FIG. 6, the pivot arm 28 then returns from this upward position, shown in phantom in FIG. 6, to its original position within the recess 66 to unwrap the wrapping strap 26. The leading end portion 22 of the material strip 24 is retained in the wrapped configuration by the guide 30. The ultrasonic welding horn 32 is then lowered to compress the overlying portions of the material strip 24 between the downward tip of the welding horn 32, and the cutting blade 52 and welding pattern 56.

The ultrasonic welder 33 is activated to weld the overlying portions of the material strip 24 together by ultrasonic vibration, as is well known in the art. A welded bond line 102 is thus formed in the material strip 24 between the welding pattern 56 and the welding horn 32. Referring to FIG. 2, this welded bond line 102 comprises a series of spaced-apart welded spots corresponding to the sawtoothed configuration of the welding pattern 56. Referring again to FIG. 6, vibration of the material strip 24 against the cutting blade 52, as the material strip 24 is ultrasonically welded, causes both the leading end portion 22 and second end portion 100 of the material strip 24 to be cut. The welded sleeve 36 is thus simultaneously severed from the remainder of the material strip 24 as the sleeve is welded.

Figure 7:
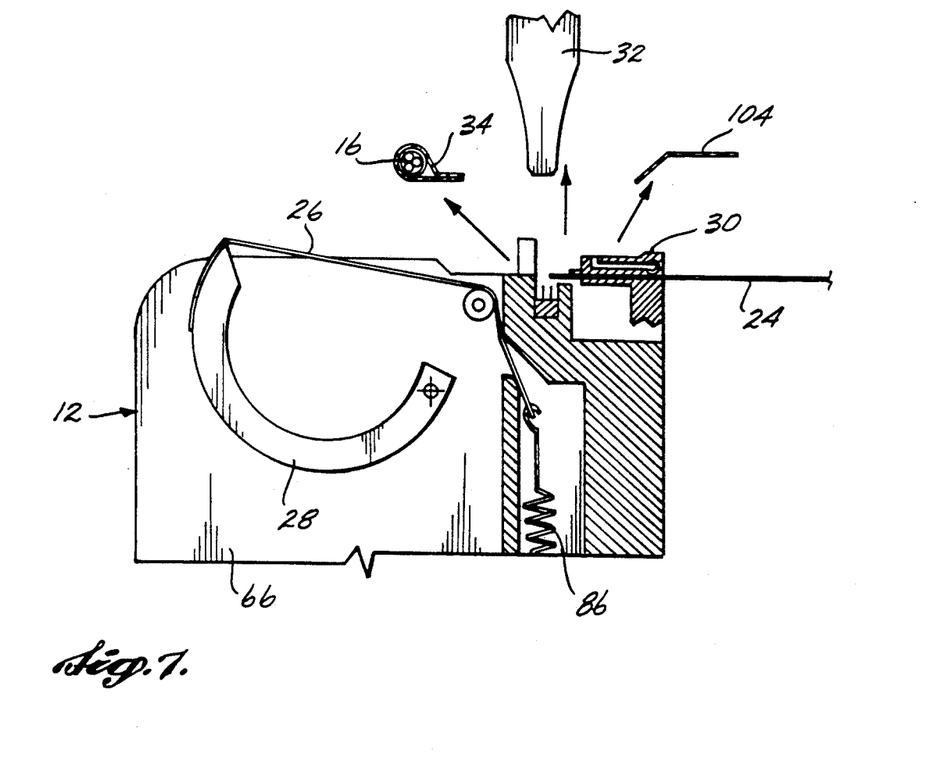

Referring to FIG. 7, the welding horn 32 is then retracted upwardly, and the conductor 16 with the indicia-marked welded sleeve 34 formed thereon can be removed from the applicator 10. Referring to FIG. 1, the applicator 10 includes a pneumatic tube 106 from a pneumatic supply 107 (FIG. 8). The tube 106 is positioned to deliver a blast of air to the welding region 15 of the base 12. Immediately after completion of the weld, the controller 88 instructs the pneumatic supply 107 to deliver a blast of air through the tube 106 to blow away a surplus portion 104 of the material strip 24 produced by the wrapping cycle.

The entire wrapping cycle, from placement of the conductor 16 to welding and severing the sleeve 34, takes only on the order of 2 seconds to complete. Thus, a large number of conductors 16 can be rapidly marked in sequence, with interruption only to reinstruct the controller 88 when it is necessary to change the indicia to be marked.

The present invention has been described in relation to a preferred embodiment of an applicator 10. However, various alterations to the preferred embodiment may be made in accordance with the present invention. For example, rather than using a vacuum drawn through the guide 30 to retain the wrapped material strip 24, a hold-down finger clamp could be lowered onto the wrapped leading end portion 22 to clamp the leading end portion 22 in place. The use of a clamp to retain the wrapped strip 24 may be preferred as the clamping force is applied vertically, rather than the use of a vacuum which could permit some horizontal slippage of the retained strip 24 under some circumstances.

As a further example of an alteration, the line printer 18 could be operated in a reverse-feed mode to eliminate the surplus portion 104 of the material strip 24 produced by each wrap and weld cycle. Thus, upon initiation of each cycle, the material strip would first be withdrawn into the printer 18 to mark the indicia on the leading end portion 22 of the strip in proximity to the edge of the strip. The printer would then feed the material strip back through the guide 30 and onto the base 12 for wrapping.

The preferred embodiment of the applicator 10 including the printer 18 has been found to reliably advance the material strip 24 to ensure that the point of the material strip on which the indicia 36 are marked is positioned around the conductor 16. However, if necessary, a tracking mechanism could be incorporated into the applicator to ensure that there is no disalignment over time. The material strip 24 would be preprinted with a series of evenly spaced visual markings, such as black dots. An optical detector could be mounted within the base 12 to sense the passage of the printed black dots as the material strip is advanced through the applicator 10. The optical detector would provide feedback to the controller 88 to ensure that the proper length of material strip 24 is advanced for accurate positioning of the indicia 36.

The applicator 10 described above enables substantially simultaneous welding and severing of the welded sleeve 34. However, if desired, a separate severing step could be performed after completion of the welding. Thus, after welding, the welding horn 32 would be withdrawn and a cutting blade would move downwardly to sever the welded sleeve 34 from the strip.

One of ordinary skill, after reading the foregoing specification, may be able to effect various other changes, alterations and substitutions of equivalents without departing from the broad concepts disclosed herein. It is therefore intended that the scope of Letters Patent granted hereon be limited only by the definitions contained in the appended claims and the equivalents thereof.

The embodiments of the invention in which an exclusive property or privilege is claimed are defined as follows:

1. A method for forming an identification sleeve around an elongate object, comprising the steps of:
   placing the elongate object on a base adjacent a stop on the base;
   feeding an end portion of a continuous strip of identification indicia bearing, ultrasonically weldable material past the elongate object to be identified, whereby the end portion of the material strip lies against a flexible strap; wrapping the flexible strap partially around the elongate object to thereby wrap the end portion of the material strip around the elongate object such that the end portion of the material strip overlaps an adjacent second portion of the material strip, whereby the flexible strap biases the elongate object against the stop on the base;
   ultrasonically welding the end portion of the material strip to the overlapped second portion of the material strip to form an indicia bearing, tubular sleeve; and
   severing the tubular sleeve from the material strip.

2. The method of claim 1, further comprising the steps of:
   securing the wrapped end portion of the material strip; and
   unwrapping the flexible strap from the elongate object prior to welding the secured end portion of the material strip.

3. The method of claim 2, wherein:
   the end portion of the wrapped material strip contacts a vacuum fixture; and
   the step of securing the wrapped end portion of the material strip comprises drawing a vacuum through the vacuum fixture to grip the wrapped end portion of the material strip.

4. The method of claim 1, wherein the step of severing the tubular sleeve from the material strip comprises guiding the end portion of the material strip over a cutting edge and an ultrasonic welding pattern, disposed adjacent the cutting edge, prior to feeding the end portion of the material strip under the elongate object, the cutting edge positioned such that vibration of the material strip against the cutting edge during the step of ultrasonically welding the material strip results in the tubular sleeve being severed from the material strip.

5. The method of claim 1, further comprising the step of printing identification indicia, corresponding to the elongate object, on the material strip prior to feeding the strip past the elongate object.

6. The method of claim 1, further comprising the steps of:
   securing the wrapped end portion of the material strip; and
   pivoting the pivot arm about the pivot axis to unwrap the flexible strap from around the elongate object prior to welding the secured end portion of the material strip.

7. A method for forming an identification sleeve around an elongate object, comprising the steps of:
   feeding an end portion of a continuous strip of identification indicia, weldable material past the elongate object, which is positioned on a base, whereby the end portion of the material strip lies against a flexible strap having a first end coupled to the base and a second end connected to the second end of a pivot arm, the pivot arm having a first end pivotally secured on a pivot axis to the base;
   pivoting the pivot arm about the pivot axis to wrap the flexible strap partially around the elongate object to thereby wrap the end portion of the material strip around the elongate object, such that the end portion of the material strip overlaps an adjacent second portion of the material strip;
   welding the end portion of the material strip to the overlapped second portion of the material strip to form an indicia bearing, tubular sleeve; and
   securing the tubular sleeve from the material strip.

* * * * *